(12) United States Patent
Davis et al.

(10) Patent No.: US 7,545,951 B2
(45) Date of Patent: Jun. 9, 2009

(54) DATA TRANSMISSION BY WATERMARK OR DERIVED IDENTIFIER PROXY

(75) Inventors: Bruce L. Davis, Lake Oswego, OR (US); William Y. Conwell, Portland, OR (US); Geoffrey B. Rhoads, West Linn, OR (US); Douglas B. Evans, San Francisco, CA (US)

(73) Assignee: Digimarc Corporation, Beaverton, OR (US)

( * ) Notice: Subject to any disclaimer, the term of this patent is extended or adjusted under 35 U.S.C. 154(b) by 552 days.

(21) Appl. No.: 11/274,758

(22) Filed: Nov. 14, 2005

(65) Prior Publication Data

US 2006/0120560 A1    Jun. 8, 2006

Related U.S. Application Data

(63) Continuation of application No. 09/504,239, filed on Feb. 15, 2000, now Pat. No. 6,965,682, which is a continuation-in-part of application No. 09/491,534, filed on Jan. 26, 2000, now abandoned, which is a continuation-in-part of application No. 09/473,396, filed on Dec. 28, 1999, now Pat. No. 6,577,746, application No. 11/274,758, which is a continuation-in-part of application No. 09/476,686, filed on Dec. 30, 1999.

(60) Provisional application No. 60/134,782, filed on May 19, 1999.

(51) Int. Cl.
*G06K 9/00* (2006.01)
*H04K 1/00* (2006.01)

(52) U.S. Cl. .................................... 382/100

(58) Field of Classification Search ................ 382/100, 382/305, 306, 299; 345/629–641; 235/494; 380/54; 358/3.28; 713/176
See application file for complete search history.

(56) References Cited

U.S. PATENT DOCUMENTS 3,406,344 A    10/1968    Hopper (Continued)

FOREIGN PATENT DOCUMENTS

EP    493091    7/1992

(Continued)

OTHER PUBLICATIONS

Ghias et al, Query by Humming: Musical Information Retrieval In An Audio Database. In ACM Multimedia, pp. 231-236, Nov. 1995.
Kageyama et al, Melody Retrieval with Humming, Proceedings of Int. Computer Music Conference (ICMC), 1993.
Matsutani, "The Construction of Copyright-Protected Image Data Technical Report of IEICE," ISEC94-58, pp. 59-68, 1995.

(Continued)

*Primary Examiner*—Yon Couso

(57) ABSTRACT

The present invention relates generally to methods usable with handheld devices (e.g., music players or cell phones) and cell phones. One claim recites a cell phone including: an input or interface to receive first content corresponding to audio or video; a media player to render audio or video; an analyzer to derive a plural-bit identifier from portions of the first content representing audio elements of the audio or video picture elements of the video; data indicating at least some capabilities of the media player; and a controller to control: i) communicating the plural-bit identifier and the data indicating the at least some capabilities of the media player to a network resource to obtain enhanced content therefrom, the enhanced content being enhanced relative to the first content, and the enhanced content being associated with the plural-bit identifier and the media player; and ii) obtaining the enhanced content from the network resource. Of course, other claims and combinations are provided as well.

39 Claims, 2 Drawing Sheets

U.S. PATENT DOCUMENTS

| | | |
|---|---|---|
| 3,586,781 A | 6/1971 | Jones |
| 3,898,390 A | 8/1975 | Wells |
| 3,919,479 A | 11/1975 | Moon et al. |
| 4,025,851 A | 5/1977 | Haselwood et al. |
| 4,284,846 A | 8/1981 | Marley |
| 4,450,531 A | 5/1984 | Kenyon |
| 4,542,525 A | 9/1985 | Hopf |
| 4,677,466 A | 6/1987 | Lert et al. |
| 4,697,209 A | 9/1987 | Kiewit et al. |
| 4,739,398 A | 4/1988 | Thomas |
| 4,789,863 A | 12/1988 | Bush |
| 4,807,031 A | 2/1989 | Broughton et al. |
| 4,843,562 A | 6/1989 | Kenyon |
| 4,858,000 A | 8/1989 | Lu |
| 4,945,412 A | 7/1990 | Kramer |
| 4,969,041 A | 11/1990 | O'Grady et al. |
| 4,972,471 A | 11/1990 | Gross et al. |
| 4,994,831 A | 2/1991 | Marandi |
| 5,001,696 A | 3/1991 | Baldwin |
| 5,031,228 A | 7/1991 | Lu |
| 5,103,459 A | 4/1992 | Gilhousen et al. |
| 5,204,902 A | 4/1993 | Reeds, III et al. |
| 5,210,820 A | 5/1993 | Kenyon |
| 5,243,423 A | 9/1993 | DeJean et al. |
| 5,315,098 A | 5/1994 | Tow |
| 5,319,735 A | 6/1994 | Preuss et al. |
| 5,385,371 A | 1/1995 | Izawa |
| 5,415,553 A | 5/1995 | Szmidla |
| 5,444,230 A | 8/1995 | Baldwin |
| 5,444,779 A | 8/1995 | Daniele |
| 5,473,631 A | 12/1995 | Moses |
| 5,474,457 A | 12/1995 | Bromley |
| 5,480,306 A | 1/1996 | Liu |
| 5,486,686 A | 1/1996 | Zdybel, Jr. et al. |
| 5,502,576 A | 3/1996 | Ramsay et al. |
| 5,509,074 A | 4/1996 | Choudhury et al. |
| 5,530,852 A | 6/1996 | Meske, Jr. et al. |
| 5,539,635 A | 7/1996 | Larson |
| 5,572,653 A | 11/1996 | DeTemple et al. |
| 5,574,519 A | 11/1996 | Manico et al. |
| 5,574,962 A | 11/1996 | Fardeau et al. |
| 5,577,266 A | 11/1996 | Takahisa et al. |
| 5,579,124 A | 11/1996 | Aijala et al. |
| 5,581,800 A | 12/1996 | Fardeau et al. |
| 5,584,070 A | 12/1996 | Harris et al. |
| 5,598,557 A | 1/1997 | Doner et al. |
| 5,606,609 A | 2/1997 | Houser et al. |
| 5,613,004 A | 3/1997 | Cooperman et al. |
| 5,621,800 A | 4/1997 | Weng et al. |
| 5,640,193 A | 6/1997 | Wellner |
| 5,646,997 A | 7/1997 | Barton |
| 5,661,787 A | 8/1997 | Pocock |
| 5,663,766 A | 9/1997 | Sizer, II |
| 5,671,267 A | 9/1997 | August et al. |
| 5,671,282 A | 9/1997 | Wolff et al. |
| 5,687,191 A | 11/1997 | Lee et al. |
| 5,703,795 A | 12/1997 | Mankovitz |
| 5,710,834 A | 1/1998 | Rhoads |
| 5,737,025 A | 4/1998 | Dougherty et al. |
| 5,740,244 A | 4/1998 | Indeck et al. |
| 5,745,569 A | 4/1998 | Moskowitz et al. |
| 5,745,782 A | 4/1998 | Conway |
| 5,761,606 A | 6/1998 | Wolzien |
| 5,764,763 A | 6/1998 | Jensen et al. |
| 5,765,152 A | 6/1998 | Erickson |
| 5,774,452 A | 6/1998 | Wolosewicz |
| 5,781,914 A | 7/1998 | Stork et al. |
| 5,782,692 A | 7/1998 | Stelovsky |
| 5,801,689 A | 9/1998 | Huntsman |
| 5,801,702 A | 9/1998 | Dolan et al. |
| 5,822,360 A | 10/1998 | Lee et al. |
| 5,822,436 A | 10/1998 | Rhoads |
| 5,828,325 A | 10/1998 | Wolosewicz et al. |
| 5,832,119 A | 11/1998 | Rhoads |
| 5,838,458 A | 11/1998 | Tsai |
| 5,841,886 A | 11/1998 | Rhoads |
| 5,841,978 A | 11/1998 | Rhoads |
| 5,848,413 A | 12/1998 | Wolff |
| 5,862,260 A | 1/1999 | Rhoads |
| 5,869,819 A | 2/1999 | Knowles et al. |
| 5,870,552 A | 2/1999 | Dozier et al. |
| 5,872,531 A | 2/1999 | Johnson et al. |
| 5,892,900 A | 4/1999 | Ginter et al. |
| 5,901,224 A | 5/1999 | Hecht |
| 5,905,248 A | 5/1999 | Russell et al. |
| 5,918,223 A | 6/1999 | Blum et al. |
| 5,932,863 A | 8/1999 | Rathus |
| 5,938,727 A | 8/1999 | Ikeda |
| 5,943,422 A | 8/1999 | Van Wie et al. |
| 5,963,957 A | 10/1999 | Hoffberg |
| 5,978,773 A | 11/1999 | Hudetz et al. |
| 5,978,791 A | 11/1999 | Farber et al. |
| 5,982,956 A | 11/1999 | Lahmi |
| 5,986,651 A | 11/1999 | Reber et al. |
| 5,986,690 A | 11/1999 | Hendricks |
| 5,988,897 A | 11/1999 | Pierce et al. |
| 5,991,500 A | 11/1999 | Kanota et al. |
| 5,999,569 A | 12/1999 | Oshima |
| 6,005,501 A | 12/1999 | Wolosewicz |
| 6,064,737 A | 5/2000 | Rhoads |
| 6,076,734 A | 6/2000 | Dougherty et al. |
| 6,081,629 A | 6/2000 | Browning |
| 6,081,827 A | 6/2000 | Reber et al. |
| 6,081,830 A | 6/2000 | Schindler |
| 6,088,455 A | 7/2000 | Logan et al. |
| 6,098,106 A | 8/2000 | Philyaw et al. |
| 6,121,530 A | 9/2000 | Sonoda |
| 6,122,403 A | 9/2000 | Rhoads |
| 6,122,526 A | 9/2000 | Parulski et al. |
| 6,125,172 A | 9/2000 | August |
| 6,141,753 A | 10/2000 | Zhao et al. |
| 6,147,940 A | 11/2000 | Yankowski |
| 6,148,333 A * | 11/2000 | Guedalia et al. ............ 709/219 |
| 6,157,721 A | 12/2000 | Shear et al. |
| 6,164,534 A | 12/2000 | Rathus |
| 6,169,541 B1 | 1/2001 | Smith |
| 6,182,090 B1 | 1/2001 | Peairs |
| 6,199,048 B1 | 3/2001 | Hudetz et al. |
| 6,199,073 B1 | 3/2001 | Peairs et al. |
| 6,240,185 B1 | 5/2001 | Van Wie et al. |
| 6,243,480 B1 | 6/2001 | Zhao et al. |
| 6,278,781 B1 | 8/2001 | Rhoads |
| 6,282,362 B1 | 8/2001 | Murphy et al. |
| 6,286,036 B1 | 9/2001 | Rhoads |
| 6,304,523 B1 | 10/2001 | Jones |
| 6,311,214 B1 | 10/2001 | Rhoads |
| 6,324,573 B1 | 11/2001 | Rhoads |
| 6,338,094 B1 | 1/2002 | Scott |
| 6,345,256 B1 | 2/2002 | Milsted et al. |
| 6,389,055 B1 | 5/2002 | August et al. |
| 6,389,538 B1 | 5/2002 | Gruse et al. |
| 6,401,206 B1 | 6/2002 | Khan et al. |
| 6,408,331 B1 | 6/2002 | Rhoads |
| 6,415,280 B1 | 7/2002 | Farber et al. |
| 6,456,725 B1 | 9/2002 | Cox et al. |
| 6,505,160 B1 | 1/2003 | Levy et al. |
| 6,510,234 B1 | 1/2003 | Cox et al. |
| 6,516,356 B1 | 2/2003 | Belknap et al. |
| 6,522,770 B1 | 2/2003 | Seder et al. |
| 6,526,449 B1 | 2/2003 | Philyaw et al. |
| 6,539,095 B1 | 3/2003 | Rhoads |
| 6,542,927 B2 | 4/2003 | Rhoads |
| 6,546,112 B1 | 4/2003 | Rhoads |
| 6,549,638 B2 | 4/2003 | Davis et al. |

| | | |
|---|---|---|
| 6,553,129 B1 | 4/2003 | Rhoads |
| 6,560,339 B1 | 5/2003 | Iwamura |
| 6,560,349 B1 | 5/2003 | Rhoads |
| 6,574,594 B2 | 6/2003 | Pitman et al. |
| 6,577,746 B1 | 6/2003 | Evans et al. |
| 6,578,008 B1 | 6/2003 | Chacker |
| 6,587,821 B1 | 7/2003 | Rhoads |
| 6,590,998 B2 | 7/2003 | Rhoads |
| 6,611,607 B1 | 8/2003 | Davis et al. |
| 6,640,306 B1 | 10/2003 | Tone et al. |
| 6,647,130 B2 | 11/2003 | Rhoads |
| 6,650,761 B1 | 11/2003 | Rodriguez et al. |
| 6,658,568 B1 | 12/2003 | Ginter et al. |
| 6,674,993 B1 | 1/2004 | Tarbouriech |
| 6,675,146 B2 | 1/2004 | Rhoads |
| 6,681,028 B2 | 1/2004 | Rodriguez et al. |
| 6,681,029 B1 | 1/2004 | Rhoads |
| 6,694,042 B2 | 2/2004 | Seder et al. |
| 6,694,043 B2 | 2/2004 | Seder et al. |
| 6,728,390 B2 | 4/2004 | Rhoads et al. |
| 6,748,360 B2 | 6/2004 | Pitman et al. |
| 6,748,533 B1 | 6/2004 | Wu |
| 6,768,980 B1 | 7/2004 | Meyer et al. |
| 6,775,392 B1 | 8/2004 | Rhoads |
| 6,782,115 B2 | 8/2004 | Decker et al. |
| 6,804,379 B2 | 10/2004 | Rhoads |
| 6,807,534 B1 | 10/2004 | Erickson |
| 6,807,676 B1 | 10/2004 | Robbins |
| 6,829,368 B2 | 12/2004 | Meyer et al. |
| 6,834,308 B1 | 12/2004 | Ikezoye et al. |
| 6,856,977 B1 | 2/2005 | Adelsbach |
| 6,869,023 B2 | 3/2005 | Hawes |
| 6,904,185 B1 * | 6/2005 | Wilkins et al. ............... 382/311 |
| 6,917,691 B2 | 7/2005 | Evans et al. |
| 6,917,724 B2 | 7/2005 | Seder et al. |
| 6,931,451 B1 | 8/2005 | Logan |
| 6,941,275 B1 | 9/2005 | Swierczek |
| 6,965,682 B1 | 11/2005 | Davis et al. |
| 6,965,873 B1 | 11/2005 | Rhoads |
| 6,968,337 B2 | 11/2005 | Wold |
| 6,973,669 B2 | 12/2005 | Daniels |
| 6,975,746 B2 | 12/2005 | Davis et al. |
| 6,985,600 B2 | 1/2006 | Rhoads |
| 6,987,862 B2 | 1/2006 | Rhoads |
| 6,990,453 B2 | 1/2006 | Wang |
| 7,010,144 B1 | 3/2006 | Davis et al. |
| 7,012,621 B2 * | 3/2006 | Crosby et al. ............... 345/619 |
| 7,024,016 B2 | 4/2006 | Rhoads et al. |
| 7,035,427 B2 | 4/2006 | Rhoads |
| 7,044,395 B1 | 5/2006 | Davis |
| 7,051,086 B2 | 5/2006 | Rhoads et al. |
| 7,058,697 B2 | 6/2006 | Rhoads |
| 7,076,084 B2 | 7/2006 | Davis et al. |
| 7,095,871 B2 | 8/2006 | Jones et al. |
| 7,113,615 B2 | 9/2006 | Rhoads et al. |
| 7,136,502 B2 | 11/2006 | Rhoads et al. |
| 7,164,413 B2 | 1/2007 | Davis |
| 7,171,018 B2 | 1/2007 | Rhoads et al. |
| 7,174,031 B2 | 2/2007 | Rhoads |
| 7,185,201 B2 | 2/2007 | Rhoads |
| 7,194,752 B1 | 3/2007 | Kenyon |
| 7,206,820 B1 | 4/2007 | Rhoads et al. |
| 7,209,573 B2 | 4/2007 | Evans et al. |
| 7,224,995 B2 | 5/2007 | Rhoads |
| 7,248,715 B2 | 7/2007 | Levy |
| 7,251,475 B2 | 7/2007 | Kawamoto |
| 7,261,612 B1 | 8/2007 | Hannigan et al. |
| 7,289,643 B2 | 10/2007 | Brunk et al. |
| 7,302,574 B2 | 11/2007 | Conwell et al. |
| 7,330,564 B2 | 2/2008 | Brundage et al. |
| 7,333,957 B2 | 2/2008 | Levey et al. |
| 7,349,552 B2 | 3/2008 | Rhoads |
| 7,359,528 B2 | 4/2008 | Rhoads |
| 7,362,781 B2 | 4/2008 | Rhoads |
| 7,362,879 B2 | 4/2008 | Evans et al. |
| 7,369,676 B2 | 5/2008 | Hein |
| 7,377,421 B2 | 5/2008 | Rhoads |
| 7,415,129 B2 | 8/2008 | Rhoads |
| 7,437,430 B2 | 10/2008 | Rhoads |
| 7,444,000 B2 | 10/2008 | Rhoads |
| 7,444,353 B1 | 10/2008 | Chen et al. |
| 7,450,734 B2 | 11/2008 | Rodriquez et al. |
| 7,461,136 B2 | 12/2008 | Rhoads |
| 2001/0008557 A1 | 7/2001 | Stefik et al. |
| 2001/0011233 A1 | 8/2001 | Narayanaswami |
| 2001/0026629 A1 | 10/2001 | Oki |
| 2001/0031066 A1 | 10/2001 | Meyer et al. |
| 2002/0028000 A1 | 3/2002 | Conwell et al. |
| 2002/0032698 A1 | 3/2002 | Cox |
| 2002/0033844 A1 | 3/2002 | Levy et al. |
| 2002/0059580 A1 | 5/2002 | Kalker |
| 2002/0069370 A1 | 6/2002 | Mack |
| 2003/0018709 A1 | 1/2003 | Schrempp et al. |
| 2003/0032033 A1 | 2/2003 | Anglin et al. |
| 2003/0033321 A1 | 2/2003 | Schrempp et al. |
| 2003/0037010 A1 | 2/2003 | Schmelzer et al. |
| 2003/0135623 A1 | 7/2003 | Schrempp et al. |
| 2003/0167173 A1 | 9/2003 | Levy et al. |
| 2003/0174861 A1 | 9/2003 | Levy et al. |
| 2003/0197054 A1 | 10/2003 | Eunson |
| 2004/0128514 A1 | 7/2004 | Rhoads |
| 2004/0145661 A1 | 7/2004 | Murakami et al. |
| 2004/0163106 A1 | 8/2004 | Schrempp et al. |
| 2004/0169892 A1 | 9/2004 | Yoda |
| 2004/0199387 A1 | 10/2004 | Wang |
| 2004/0201676 A1 | 10/2004 | Needham |
| 2004/0223626 A1 | 11/2004 | Honsinger et al. |
| 2005/0043018 A1 | 2/2005 | Kawamoto |
| 2005/0044189 A1 | 2/2005 | Ikezoye et al. |
| 2005/0058319 A1 | 3/2005 | Rhoads |
| 2005/0091268 A1 | 4/2005 | Meyer |
| 2005/0229107 A1 | 10/2005 | Hull |
| 2006/0031684 A1 | 2/2006 | Sharma et al. |
| 2006/0122839 A1 | 6/2006 | Wang |
| 2007/0100757 A1 | 5/2007 | Rhoads |
| 2007/0195987 A1 | 8/2007 | Rhoads |
| 2007/0250194 A1 | 10/2007 | Rhoads et al. |
| 2008/0009310 A1 | 1/2008 | Rhoads et al. |
| 2008/0019569 A1 | 1/2008 | Rhoads et al. |
| 2008/0140573 A1 | 6/2008 | Levy et al. |
| 2008/0140714 A1 | 6/2008 | Rhoads et al. |
| 2008/0208891 A1 | 8/2008 | Wang |
| 2008/0273747 A1 | 11/2008 | Rhoads |

FOREIGN PATENT DOCUMENTS

| | | |
|---|---|---|
| EP | 0581317 | 2/1994 |
| EP | 0642060 | 3/1995 |
| EP | 0967803 | 12/1999 |
| EP | 1173001 | 1/2002 |
| EP | 1199878 | 4/2002 |
| EP | 1049320 B1 | 1/2003 |
| EP | 1049320 B1 | 1/2003 |
| JP | 4-335480 | 11/1992 |
| JP | 5-037795 | 2/1993 |
| JP | 8-050598 | 2/1996 |
| JP | 08-50598 | 2/2006 |
| JP | 3949679 | 7/2007 |
| WO | WO 9400842 | 1/1994 |
| WO | WO 9510813 | 4/1995 |
| WO | WO 9514289 | 5/1995 |
| WO | WO 9702522 | 1/1997 |
| WO | WO 97/43736 | 11/1997 |
| WO | WO97043736 | 11/1997 |
| WO | WO00036605 | 6/2000 |
| WO | WO00079709 | 12/2000 |

| | | |
|---|---|---|
| WO | 0172030 | 9/2001 |
| WO | 0175794 | 10/2001 |
| WO | 02082271 | 10/2002 |

OTHER PUBLICATIONS

Muscle Fish press release, Muscle Fish's Audio Search Technology to be Encapsulated into Informix Datablade Module, Jul. 10, 1996.
Peairs, "Iconic Paper," Proceedings of the Third International Conference on Document Analysis and Recognition (ICDAR '95), pp. 1174-1179, 1995.
Whittaker, et al., "Back to the Future: Pen and Paper Technology Supports Complex Group Coordination," CHI '95, Conference on Human Factors in Computing Systems, Denver, Colorado (May 7-11, 1995).
Wold et al, Content-Based Classification, Search, and Retrieval of Audio, IEEE Multimedia Magazine, Fall, 1996.
Zhao, "A WWW Service to Embed and Prove Digital Copyright Watermarks," Fraunhofer Institute for Computer Graphics, Proc. of EU Conf. on Multimedia Applications, Services and Techniques, May 1996, 15 pages.
Nov. 13, 2008 final Office Action; Aug. 5, 2008 Amendment; and Feb. 5, 2008 Office Action, each from assignee's U.S. Patent No. 09/952,475 (published as US 2002/0033844 A1).
Mar. 31, 2008 Notice of Allowance (including Examiner's search history), and Feb. 21, 2008 Amendment, each from assignee's U.S. Appl. No. 11/265,544 (now US Patent No. 7,461,136).
Digimarc, "Frequently Asked Questions About Digimarc Signature Technology," Aug. 1995.
Foote, "An Overview of Audio Information Retrieval," Multimedia Systems, v. 7 n. 1, p. 2-10, Jan. 1999.
Highwater FBI Ltd., "FBI Presentation: Image Copyright Protection Software," Jul. 1995.
Highwater FBI, "Copyright Protection for Digital Images, Digital Fingerprinting from FBI," Brochure, 4 pp., 1995.
Smith, et al. "Music Information Retrieval Using Audio Input," Proc. AAAI Spring Symposium on Intelligent Integration and Use of Text, Image, Video and Audio Corpora, pp. 12-16, 1997.
Blackburn, "A Tool for Content Based Navigation of Music," ACM Multimedia 98.
deRoure, "Multiagent System for Content Based Navigation of Music," ACM Multimedia, Oct. 1999, 4 pp.
Feb. 11, 2009 Preliminary Amendment from assignee's U.S. Appl. No. 11/867,480 (published as US 2008/0140714 A1).
Oct. 31, 2008 Notice of Allowance (including Examiner-Initiated Interview Summary); Jun. 16, 2008 Applicant Summary of interview and Terminal Disclaimer; Jun. 3, 2008 Examiner Interview Summary; Apr. 28, 2008 Amendment; Nov. 27, 2007 non-final Office Action; all from assignee's U.S. Appl. No. 10/823,997 (published as US 2005/0058319 A1).
Jun. 16, 2008 Information Disclosure Statement letter from assignee's U.S. Appl. No. 10/823,997 (published as US 2005/0058319 A1).
Feb. 2, 2009 Supplemental Response; Jan. 15, 2009 Supplemental Response; Jan. 14, 2009 Examiner Interview Summary; Jan. 13, 2009 Amendment (including interview summary) and Terminal Disclaimer; Dec. 23, 2008 non-final Office Action; Nov. 14, 2008 Amendment and Terminal Disclaimer; Oct. 31, 2008 non-final Office Action; all from assignee's U.S. Appl. No. 11/927,075 (published US 2008/01239182 A1).
Jan. 13, 2009 Information Disclosure Statement letter from assignee's U.S. Appl. No. 11/927,075 (published US 2008/01239182 A1).
Feb. 17, 2009 Amendment; and Oct. 14, 2008 non-final Office Action; all from assignee's U.S. Appl. No. 11/382,850 (published as US 2007/0195987 A1).
Jul. 12, 2006 Notice of Allowance; Apr. 17, 2006 Supplemental Briefing; Mar. 17, 2006 Order Remanding to the Examiner; Oct. 3, 2006 Supplemental Appeal Brief;.
Jun. 6, 2005 Reply Brief; Apr. 6, 2005 Examiner's Answer; Oct. 13, 2004 Appeal Brief; Apr. 13, 2004 Amendment After Final Rejection; Jan. 13, 2004 final Office Action (including interview summary); all from assignee's U.S. Appl. No. 10/147,228 (now US Patent No. 7,171,018).
Jan. 26, 2009 Amendment; and Sep. 26, 2008 non-final Office Action; all from assignee's U.S. Appl. No. 11/004, 711 (published as US 2005/0091268 A1).
Sep. 18, 2000 Communication (Search Report) from the European Patent Office in Assignee's European Patent Application No. 97 924 752.2 (published as EP1019868.
Nov. 18, 2005 Communication from the European Patent Office in Assignee's European Patent Application No. 97 924 752.5 (published as EP1019868), and Assignee's May 26, 2006 Response thereto.
Jun. 6, 2007 Summons to attend oral proceedings from the European Patent Office in Assignee's European Patent Application No. 97 924 752.5 (published as EP1019868), and Assignee's Dec. 20, 2007 Response thereto.
Allowed Claims from assignee's Japanese patent application No. 2004-224727 (published as JP 3949679); and Mar. 24, 2006 Notice of Reason(s) For Rejection (English Translation) in the JP 2004-224727 application.
Allowed Claims from assignee's Japanese patent application No. 2004-224727 (published as JP 3949679); and Mar. 24, 2006 Notice of Reason(s) For Rejection (English Translation) in the JP 2004-224727 application.
Mar. 31, 2008 Notice of Allowance (including Examiner's search history), and Feb. 21, 2008 Amendment, each from assignee's application No. 11/265,544 (published as US 2006/0136565 A1).
May 26, 2006 Response to the Nov. 18, 2005 Communication from the EPO in Assignee's European Patent Application No. 97 924 752.5.
U.S. Appl. No. 60/222,023, filed Jul. 31, 2000.
Sep. 27, 2000 Specification; Jul. 15, 2008 Amendment, and Nov. 28, 2008 non-final Office Action; all from U.S. Appl. No. 09/671,571, filed Sep. 27, 2000.
Feb. 5, 2009 Notice of Abandonment; Jul. 18, 2009 final Office Action; Jun. 22, 2007 Amendment; Mar. 22, 2007 non-final Office Action; Oct. 31, 2006 Request for Rehearing Decision; Jul. 31, 2006 Request for Rehearing; May 31, 2006 Decision on Appeal; May 24, 2005 Reply Brief; Mar. 24, 2005 Examiner's Answer; Aug. 23, 2004 Appeal Brief; Jan. 21, 2004 final Office Action; all from assignee's U.S. Appl. No. 09/636,102.
U.S. Appl. No. 12/258,174 filed Oct. 24, 2008 (including filing receipt, declaration, application data sheet, specification, claims and drawings).
Feb. 17, 2009 Amendment; Oct. 14, 2008 non-final Office Action; all from assignee's U.S. Appl. No. 11/382,950 (published as US 2007-0195987 A1).
U.S. Appl. No. 12/275,530 filed Nov. 21, 2008 (including filing receipt, declaration, application data sheet, specification, claims and drawings).

* cited by examiner

DATA TRANSMISSION BY WATERMARK OR DERIVED IDENTIFIER PROXY

RELATED APPLICATION DATA

This application is a continuation of U.S. patent application Ser. No. 09/504,239, filed Feb. 15, 2000 (U.S. Pat. No. 6,965,682). The Ser. No. 09/504,239 application is a continuation-in-part of application Ser. No. 09/491,534, filed Jan. 26, 2000, which is a continuation-in-part of application Ser. No. 09/473,396, filed Dec. 28, 1999 (U.S. Pat. No. 6,577,746). The Ser. No. 09/504,239 application also claims the benefit of U.S. Provisional Patent Application No. 60/134,782, filed May 19, 1999, the disclosure of which is attached as Appendix A. This application is also a continuation-in-part of copending application Ser. No. 09/476,686, filed Dec. 30, 1999, entitled Watermark-Based Personal Audio Appliance. Each of the above U.S. patent documents is hereby incorporated by reference.

FIELD OF THE INVENTION

The present invention relates to data transmission, and more particularly relates to use of watermarks as proxies for data in transmission.

SUMMARY OF THE INVENTION

As detailed in the assignee's prior applications, including provisional application Nos. 60/134,782, 60/141,538, and Ser. No. 09/343,104, digital watermark technology has numerous applications beyond its traditional role of simply communicating copyright information. One futuristic view foresees that all "content" should be watermarked, thereby enabling a great variety of operations and transactions whenever watermarked content is processed by digital devices equipped with watermark recognition and reading technology. All physical media objects can thereby be inherently and persistently digitally-enabled, permitting greatly simplified access to networks and execution of local and remote applications. The continuing growth of the Internet and beginnings of trends toward pervasive computing signal an opportunity to radically change the relationships between traditional media content and digital processing environments.

In this specification, content refers not just to electronic audio, image, and video files, but also includes the content aspects of physical objects and media, e.g., artwork, patterns, and labels on product packaging, concert tickets, etc.

In accordance with a preferred embodiment of the present invention, the processing of watermark data as pointer to shared resources is sometimes used in lieu of transmitting from point to point the object with which it is associated, thereby gaining efficiencies in speed and bandwidth.

This and other features and advantages of the present invention will be more readily apparent from the following detailed description, which proceeds with reference to the accompanying drawings.

DETAILED DESCRIPTION

Figure 1:
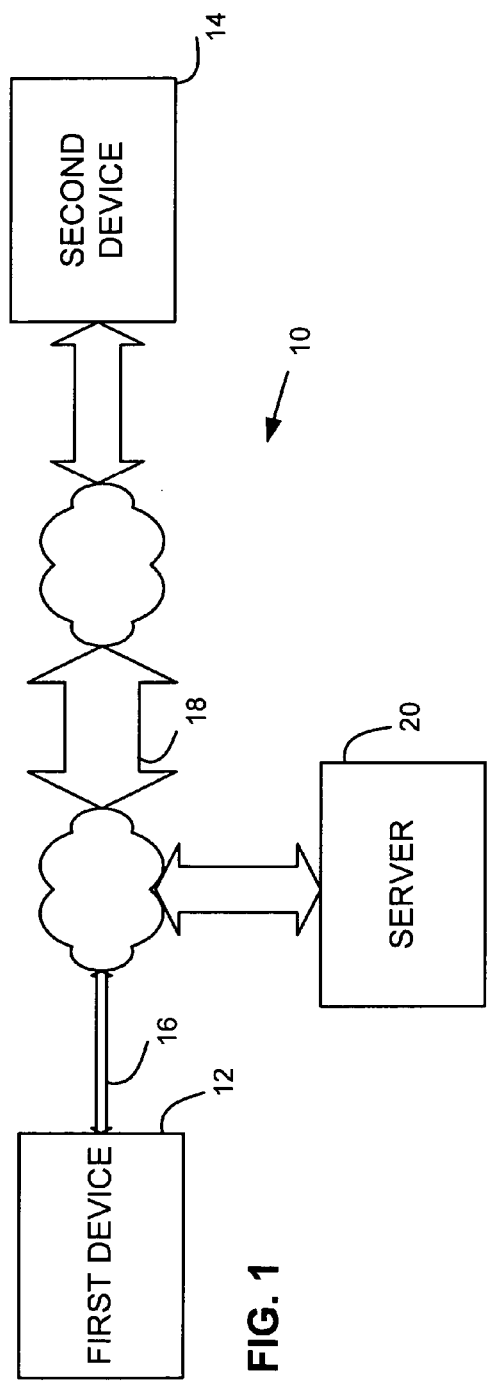
FIG. 1 is a diagram illustrating a network environment in which principles of the present invention may be employed.

Referring to FIG. 1, consider an exemplary network 10 linking two devices—a first device 12 associated with an originating user, and a second device 14 associated with a recipient user. The first device 12 is coupled to the network through a relatively low bandwidth channel, whereas the second device 14 is coupled to the network through a relatively high bandwidth channel. (For example, the first device may be an internet-capable cell phone having low resolution-, still image only-capture capabilities, providing a 9600 baud data channel, or it may be a home PC, with an associated PC or digital single shot camera, coupled to the internet with a 28.8 kbps modem. The second device may be a computer coupled to the internet through a 1.45 megabit per second T-1 line, a cable modem, etc.) The network 10 connecting the two devices includes various links—narrow bandwidth at some parts (e.g., 16), very broadband at other (e.g., internet backbone 18), etc.

Assume the user of device 12 encounters a printed image, e.g., an advertisement in a magazine, that may be of interest to the user of device 12. Using an imaging device (e.g., a CMOS- or CCD-camera built into a cell phone, a flatbed scanner connected to a PC, etc.), device 12 captures an image of the advertisement.

In prior art techniques, the image captured by device 12 would have been sent to device 14 over the network; the image received by the second device would be exactly the image sent by the first device.

Figure 2:
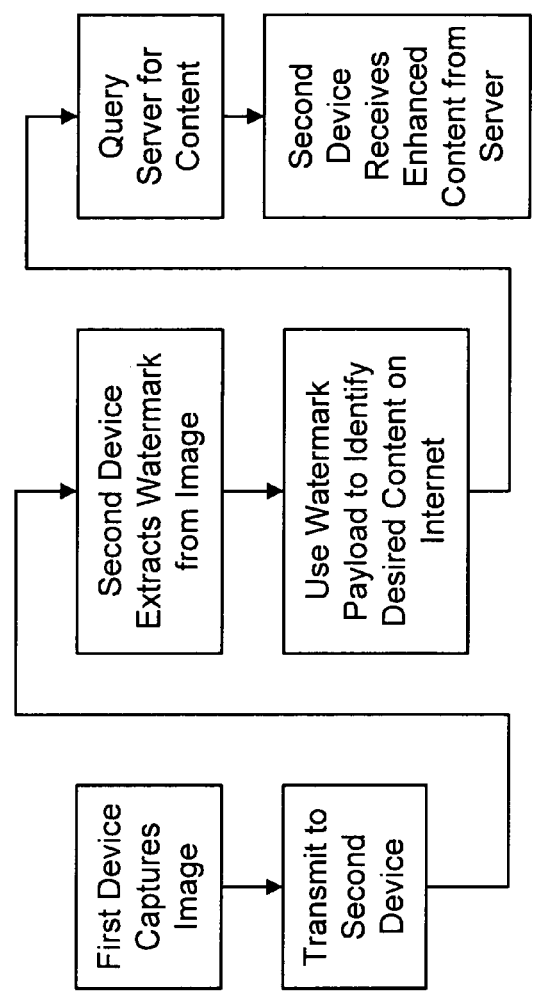
FIG. 2 is a flow chart illustrating aspects of one embodiment of the present invention.

In accordance with one embodiment of the invention, device 14 receives a better image than that sent from device 12. In one such embodiment, device 14 receives the image data captured by device 12. Device 14 recognizes that the image includes a watermark hidden within the image data, and decodes same. The watermark payload includes an index by which a copy of the image can be accessed from a server 20 on the internet or other storage medium. With this index, the second device 14 queries the server 20, which returns the image corresponding to this watermark index (in this case, the advertisement) back to the second device 14. The image provided by the server can be higher resolution or pristine, i.e., it has no artifacts left from scanning at device 12, etc. Such a procedure is shown by the flowchart of FIG. 2.

The watermark payload identifying the sensed image can as long or as short as the application requires. Typically, payloads of between 16. and 64 bits are used, although this is not essential. Shorter payloads have the advantage that they can be more robustly encoded while maintaining a fixed degree of image quality; longer payloads offer a greater universe of identifiers with which the image can be labeled. Illustrative watermarking technology is detailed in the assignee's U.S. Pat. Nos. 5,862,260 and in 6,614,914. A great variety of other watermarking arrangements may be used, including those proposed in U.S. Pat. Nos. 5,930,369, 5,933,798, 5,664,018, 5,825,892, 5,940,429 and 5,889,868.

Figure 3:
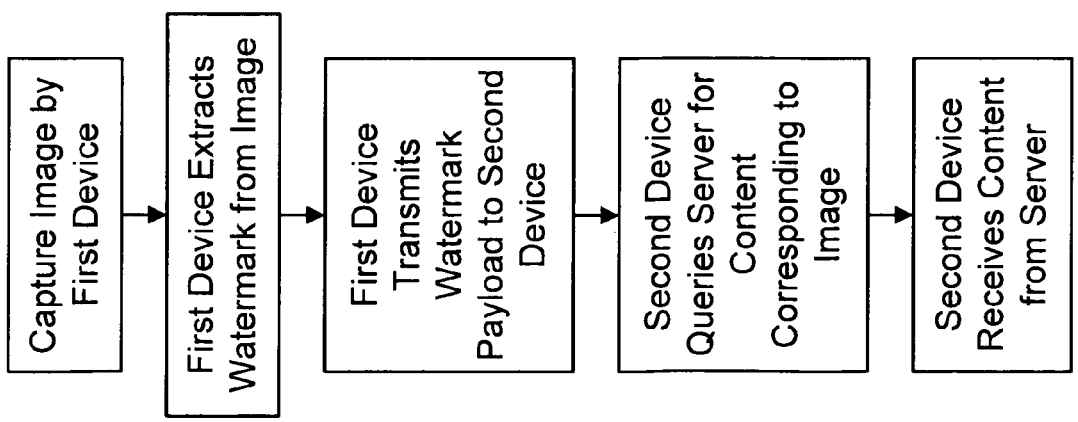
FIG. 3 is a flow chart illustrating aspects of another embodiment of the present invention.

In accordance with another embodiment of the invention (FIG. 3), the bandwidth bottleneck imposed by narrowband channel 16 (through which device 12 is coupled) is obviated by employing a watermark as a proxy for an image. In such an arrangement, the image data captured by device 12 is decoded, and a watermark payload hidden in the image is extracted. (This can be performed by hardware or software available in device 12, e.g., a cell phone microprocessor, a desktop computer, dedicated decoder circuitry, etc. Alternatively, this decoding can be done remotely from device 12, but before device 14, e.g., by a smart router in the intervening network. In the following discussion, decoding in the device 12 is assumed.) Instead of transmitting the image data over the network, the watermark decoding device (e.g., device 12) simply transmits the watermark payload (or a part thereof). On receipt of the payload, device 14 again queries the server 20, and obtains the image (and/or additional content or functionality, as detailed below), corresponding to that watermark. The image is obtained over the high-speed channel(s) between the server and the second device; the low bandwidth channel linking the first device conveys just the low bandwidth watermark payload information.

By building filters into the low bandwidth devices, upon recognition of a class of watermarks indicating availability of the image as a shared resource, or upon user selection of "transmit only watermark data", the image [or content associated with it via the watermark] can be made available to the message recipient via more capable transmission means.

Figure 4:
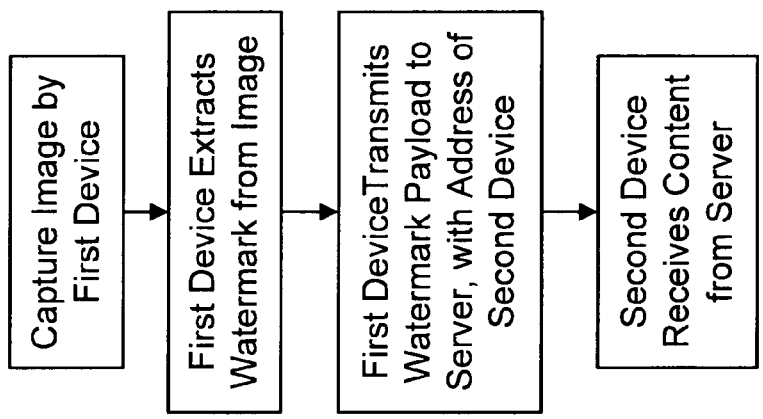
FIG. 4 is a flow chart illustrating aspects of yet another embodiment of the present invention.

A variant of the foregoing does not transmit the watermark payload to the second device 14. Instead, the payload is dispatched by the first device 12 (or the smart router) directly to the server 20, with instructions that the corresponding desired image be sent to the second device 14. Such an arrangement is shown in FIG. 4.

In some applications, the media delivered by the server may be richer than the simple image captured by device 12. For example, the watermark payload in the image captured by device 12 may index one or more files on server 20 that includes video, animation, sound, executable applications, aplets (e.g., JAVA, ActiveX) etc ("enhanced content"). Thus, scanning of a magazine ad at one device can prompt delivery of a video, a Macromedia ShockWave presentation, etc., to the second device.

In some embodiments, the second device 14 identifies to the server 20 its media-playback capabilities. The server 20 can then respond to a watermark-based query with media appropriate to that particular media consumer.

One way the media capabilities of device 14 can be indicated to server 20 is by a data word comprising flag bits, with each set "1" bit indicating a capability. A simplified 8-bit capability word may be as follows:

| Bit | Capability |
| --- | --- |
| 0 | GIF file display |
| 1 | TIFF file display |
| 2 | JPEG filed display |
| 3 | AVI movie display |
| 4 | WAV sound |
| 5 | RealAudio sound |
| 6 | MP3 sound |
| 7 | WindowsMedia |

The data comprising this word may be automatically compiled on device 14, e.g., from the operating system database with which programs are registered on installation (the Registry database in Windows).

If device 14 sends the capability word 10101100 to server 20, the server knows the device 14 supports GIF and JPEG imagery (but not TIFF), and RealAudio and WAV sound (but not MP3 or WindowsMedia).

If server 20 has media content corresponding to the queried watermark in several supported formats, it can deliver certain ones according to a priority order (e.g., send JPEG if supported; else send GIF if supported; else send TIFF if supported).

If the server 20 only has media in a format not supported by the second device 14 (e.g., TIFF in the foregoing example), the server may invoke a conversion routine to perform an on-the-fly conversion to a supported media type (e.g., JPEG) prior to sending to the second device 14.

If the watermark index is provided by the second device 14 (rather than directly from the first device 12), the capability data word can accompany the index.

If the watermark index is provided directly from the first device 12, the server can solicit from the second device 14 a data capability word before responding to the query. Alternatively, the server can keep, on-file, a database detailing the media capabilities of all known media consumers, and can tailor its query response according to such profile. (The second device 14 can be arranged to automatically inform server 20 of updates to its capability, e.g., each time a new media playback application is registered in the registry database.)

If the server 20 does not know, and cannot discern, the media capabilities of the second device 14, it can provide media in a default form that is most likely to be acceptable (e.g., JPEG, if the content captured by the first device 12 is imagery).

From the foregoing description, it will be apparent that embodiments of the present invention provide various advantages over the prior art. One is the dispatch of high bandwidth enhanced content using a low bandwidth channel. Another is the receipt of higher-quality data than that originally captured. Another is delivering applications via low bandwidth channels to recipients by capturing images or watermark data from media content that serve as proxies for the applications.

Having described and illustrated the principles of our invention with reference to a specific embodiment, it will be recognized that the principles thereof can be implemented in other, different, forms.

For example, while the invention has been described with reference to images, the same principles are equally applicable to video and audio.

Similarly, while the foregoing description has made reference to transmitting the watermark, in many implementations only a part of the watermark need be transmitted. (The watermark may include error correcting information, or other data, not necessary to identify the corresponding data on the server 20.)

Still further, while the detailed embodiment contemplated a still or video camera system for first device 12, much of the functionality of such an image capture system isn't essential to the present invention. Instead, an input device that serves a simpler "watermark capture" function may be used instead. Such a device can omit, e.g., hardware or software components associated with pixel interpolation (commonly used to achieve a desired virtual resolution), formatting (e.g., to provide output in JPEG form), etc. Such components serve useful functions when the resulting imagery is to be displayed or printed, but are superfluous—or detrimental—when the image data is simply to be decoded to extract watermark data.

While the invention is illustrated with reference to steganographic watermark technology for identifying the initial content (i.e., that sensed by device 12), other technologies can alternatively be used. These include data glyphs, 1- and 2-D barcodes, magnetic ink, RF ID tags, UV or IR markings, etc.

While the detailed embodiment contemplated a single server 20 to serve as the repository of content corresponding to watermarks, in other embodiments such a server is implemented in distributed fashion. In some embodiments, one server may act as a default repository, and can dispatch queries to other servers if the first server cannot provide the requested data. Caching of frequently-requested content can be provided at various locations through the network. Additional details on such network configurations can be found in application Ser. No. 09/343,104.

As is familiar to those skilled in the arts, the foregoing methods may be performed using dedicated hardware at devices 12, 14 and 20, and/or through use of processors programmed in accordance with firmware or software, etc. In the latter case the processors may each include a CPU and associated memory, together with appropriate input and output devices/facilities. The software can be resident on a physical storage media such as disks, and can be loaded into the processors' memory for execution. The software includes instructions causing the CPU to perform the various processes detailed above.

To provide a comprehensive disclosure without unduly lengthening this specification, applicant incorporates by reference the patents and applications cited above.

In view of the wide variety of embodiments to which the principles of our invention can be applied, it should be recognized that the detailed embodiments are illustrative only and should not be taken as limiting the scope of the invention. Rather, we claim as our invention all such embodiments as may come within the scope and spirit of the following claims, and equivalents thereto.

We claim:

1. A method of obtaining content comprising:
    receiving first content corresponding to an object on a handheld device, wherein said handheld device comprises a media player executing thereon;
    analyzing the first content for steganographic encoding, wherein the steganographic encoding comprises a plural-bit payload, whereby the plural-bit payload is obtained from said act of analyzing;
    providing data indicating media player capabilities of the handheld device;
    communicating the plural-bit payload and the data indicating media player capabilities of the handheld device to a network resource;
    receiving, from the network resource, enhanced content, relative to the first content, that is associated with the plural-bit payload and the media player on the handheld device.

2. The method of claim 1 wherein the handheld device comprises a cell phone.

3. The method of claim 1 wherein the steganographic encoding comprises digital watermarking that subtly alters content to convey the plural-bit payload.

4. The method of claim 1 wherein the object comprises audio or video.

5. The method of claim 1 wherein the content corresponding to the object comprises optical scan data, and the object comprises a physical object.

6. A cell phone comprising:
    an input or interface to receive first content coffesponding to an object;
    a media player to render content;
    a decoder to analyze the first content for steganographic encoding, wherein the steganographic encoding comprises a plural-bit payload, the plural-bit payload is obtained by said decoder;
    data indicating at least some of the media player's capabilities;
    a controller to control:
        i) communication of the plural-bit payload and the data indicating at least some of the media player's capabilities to a network resource;
        ii) reception, from the network resource, of enhanced content, the enhanced content being enhanced relative to the first content, the enhanced content being associated with the plural-bit payload and the media player.

7. The cell phone of claim 6 wherein the steganographic encoding comprises digital watermarking that alters content to convey the plural-bit payload, and the decoder comprises a digital watermark decoder.

8. The cell phone of claim 6 wherein the object comprises audio or video.

9. The cell phone of claim 6, further comprising processing circuitry, wherein the controller comprises at least software executed by said processing circuitry.

10. The cell phone of claim 6 wherein the controller comprises at least a microprocessor or dedicated processing circuitry.

11. A cell phone comprising:
    an input or interface to receive first content conesponding to audio or video;
    a media player to render audio or video;
    an analyzer to derive a plural-bit identifier from portions of the first content representing audio elements of the audio or video picture elements of the video;
    data indicating at least some capabilities of the media player; and
    a controller to control:
        i) communicating the plural-bit identifier and the data indicating the at least some capabilities of the media player to a network resource to obtain enhanced content therefrom, the enhanced content being enhanced relative to the first content, and the enhanced content being associated with the plural-bit identifier and the media player; and
        ii) obtaining the enhanced content from the network resource.

12. The cell phone of claim 11, further comprising processing circuitry, wherein said controller comprises at least software executed by said processing circuitry.

13. The cell phone of claim 11 wherein the controller comprises at least a microprocessor or dedicated processing circuitry.

14. The cell phone of claim 11 wherein the plural-bit identifier is steganographically hidden in portions of the first content representing audio portions of the audio or video picture elements of the video.

15. The cell phone of claim 14 wherein the analyzer comprises a steganographic data decoder.

16. The cell phone of claim 15 wherein the plural-bit identifier is steganographically hidden in the portions of the first content with digital watermarking that alters content to convey the plural-bit identifier.

17. The cell phone of claim 11 wherein the input or interface comprises a microphone.

18. The cell phone of claim 6 wherein the input or interface comprises a microphone.

19. A method comprising:
    receiving first content corresponding to audio or video on a haudheld device, wherein said handheld device comprises a media player;
    using one or more processors, analyzing the first content to derive identifying data from portions of the first content representing audio elements of the audio or representing video picture elements of the video:
obtaining information associated with a class or capabilities of the handhed device;
communicating the identifier identifying data and the information associated with the class or the capabilities of the handheld device to a network resource;
obtaining, from a network resource additional content, enhanced or improved relative to the first content, that is associated with the plural bit identifying data and the information.

20. The method of claim 19 wherein the handheld device comprises a cell phone or music player.

21. The method of claim 19 wherein the act of analyzing the first content to derive the identifying data from portions of the first content representing audio elements of the audio or representing video picture elements of the video comprises decoding information hidden in data representing the first content thorough alterations to the data.

22. The method of claim 19 wherein the information indicates media player capabilities.

23. A method comprising:
receiving an identifier and information from a handheld device, the identifier having been derived from one or more portions of first content utilizing at least a processor, the first content representing audio elements of audio or representing video picture elements of video, wherein the handheld device comprises a media player, and
the information indicates capabilities associated with the handheld device;
with reference to a computerize database or index, determining additional content, enhanced or improved relative to the first content, that is associated with the identifier and the information; and
providing information associated with the additional content to the handheld device.

24. The method of claim 23 wherein the handheld device comprises a cell phone or music player.

25. The method of claim 23 wherein the plural-bit identifier is decoded from the one or more portions of the first content representing audio elements of the audio or representing video picture elements of the video.

26. The method of claim 23 wherein the information indicates media play capabilities.

27. The method of claim 19 wherein the identifying data comprises one or more plural-bit identifiers.

28. The method of claim 19 wherein said act of obtaining comprises obtaining one or more links corresponding to one or more websites in which the additional content may be purchased.

29. The method of claim 19 wherein the capabilities are associated with display or sound attributes of the handheld device.

30. A cell phone comprising:
a microphone to capture first content corresponding to audio or video;
a media player to render audio or video;
one or more processors to:
derive identifying data from portions of the first content representing audio elements of the audio or representing video picture elements of the video;
control communication of the identifying data and information associated with capabilities or class of the cell phone to a network resource;
control obtaining, from a network resource, additional content enhanced or improved relative to the first content that is associated with the identifying data and the information.

31. The cell ihone of claim 30 in which the one or more processors are provided to derive the identifying data from portions of the first content representing audio elements of the audio or representing video picture elements of the video by decoding information hidden in data representing the first content thorough alterations to the data.

32. The cell phone of 30 in which the information indicates media player capabilities.

33. The cell phone of claim 30 in which the identifying data comprises one or more plural-bit identifiers.

34. The cell phone of claim 30 in which the one or more processors are provided to control obtaining one or more links corresponding to one or more websites in which the additional content may be purchased.

35. The cell phone of claim 30 wherein the capabilities are associated with display or sound attributes of the handheld device.

36. A method comprising:
receiving, without payment therefore, first audio or video content at a handheld device, the handheld device comprising at least one or more processors;
utilizing at least the one or more processors, deriving identifying data from the first audio or video content, at least some of the identifying data corresponds to the first audio or video content;
wirelessly sending the identifying data from the handheld device;
making a payment; and
wirelessly receiving second audio or video content at the handheld device, the second audio or video content comprises higher fidelity than the first audio or video content.

37. The method of claim 36 further comprising: obtaining information associated with: i) capabilities of the handheld device, or ii) class of the handheld device; in which said act of wirelessly sending the identifying data from the handheld device includes wirelessly sending the information from the handheld device.

38. One or more computer readable media comprising instructions stored thereon to cause one or more processors to perform the method of claim 36.

39. One or more computer readable media comprising instructions stored thereon to cause one or more processors to perform the method of claim 37.

* * * * *